United States Patent
Hadaschik et al.

(10) Patent No.: US 11,950,100 B2
(45) Date of Patent: Apr. 2, 2024

(54) METHOD FOR DETERMINING A JITTER ATTACK, JITTER ATTACK DETECTING DEVICE, AND COMPUTER PROGRAM

(71) Applicant: Fraunhofer-Gesellschaft zur Foerderung der angewandten Forschung e.V., Munich (DE)

(72) Inventors: Niels Hadaschik, Erlangen (DE); Marc Fassbinder, Erlangen (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 606 days.

(21) Appl. No.: 17/252,315

(22) PCT Filed: Jun. 7, 2019

(86) PCT No.: PCT/EP2019/064948
§ 371 (c)(1),
(2) Date: Dec. 15, 2020

(87) PCT Pub. No.: WO2020/007570
PCT Pub. Date: Jan. 9, 2020

(65) Prior Publication Data
US 2021/0266747 A1 Aug. 26, 2021

(30) Foreign Application Priority Data
Jul. 3, 2018 (EP) .................................... 18181557

(51) Int. Cl.
*H04W 12/122* (2021.01)
*H04W 12/63* (2021.01)
(Continued)

(52) U.S. Cl.
CPC ......... *H04W 12/122* (2021.01); *H04W 12/63* (2021.01); *H04W 24/04* (2013.01); *H04W 24/10* (2013.01); *H04W 72/0453* (2013.01)

(58) Field of Classification Search
CPC ... H04W 12/122; H04W 12/63; H04W 24/04; H04W 24/10; H04W 72/0453; H04W 12/08; H04W 12/06; B60R 25/24
See application file for complete search history.

(56) References Cited

U.S. PATENT DOCUMENTS 9,697,659 B2    7/2017  Blatz
2007/0025265 A1* 2/2007  Porras ................. H04W 12/122
                                                          370/252
(Continued)

FOREIGN PATENT DOCUMENTS

JP   2017189995 A   10/2017
KR   101716244 B1    3/2017

OTHER PUBLICATIONS

Òlafsdòttier, Hildur et al.: "On the Security of Carrier Phase-based Ranging", Oct. 19, 2016 (Oct. 19, 2016); ETH Zurich, Switzerland XP05540139, Retrieved from the Internet: URL: https://eprint.iacr.org/2017/591.pdf [retrieved on Nov. 20, 2017]; Chapter 1, 2.2, 3.1, 3.2, 3.3, 3.4, 4.2.

*Primary Examiner* — J. Brant Murphy
(74) *Attorney, Agent, or Firm* — 2SPL Patent Attorneys PartG mbB; Kieran O'Leary

(57) ABSTRACT

A method to determine a jitter attack on authorization system granting permission using a resource comprising: receiving at least three subcarrier signals from an authentication device, determining a relative phase deviation from an expected relative phase behavior for the at least three subcarrier signals, and concluding on a jitter attack if the relative phase deviation fulfills a predetermined criterion.

16 Claims, 4 Drawing Sheets

(51) Int. Cl.
*H04W 24/04* (2009.01)
*H04W 24/10* (2009.01)
*H04W 72/0453* (2023.01)

(56) References Cited

U.S. PATENT DOCUMENTS

| | | | | |
|---|---|---|---|---|
| 2016/0204823 | A1* | 7/2016 | Lovberg | H04L 27/2332 |
| | | | | 375/219 |
| 2016/0207573 | A1 | 7/2016 | Kitakata et al. | |
| 2016/0275734 | A1* | 9/2016 | Blatz | B60R 25/24 |
| 2018/0205528 | A1* | 7/2018 | Bai | H04L 5/0092 |
| 2018/0241593 | A1* | 8/2018 | Tirucherai Muralidharan | |
| | | | | H04L 5/0091 |
| 2018/0288092 | A1* | 10/2018 | Linsky | H04L 63/1466 |
| 2019/0141056 | A1* | 5/2019 | Estabrooks | H04L 43/08 |

* cited by examiner

METHOD FOR DETERMINING A JITTER ATTACK, JITTER ATTACK DETECTING DEVICE, AND COMPUTER PROGRAM

CROSS-REFERENCE TO RELATED APPLICATIONS

This application is a 35 U.S.C. § 371(c) national stage entry of PCT/EP2019/064948, filed Jun. 7, 2019. That application claimed priority to EP 18181557.2, filed Jul. 3, 2018. The contents of the earlier filed applications are incorporated by reference herein in their entirety.

FIELD

Examples relate to wireless communication for authorization methods.

BACKGROUND

In authorization systems, the communication between a mobile transponder and the authorization instance may assure that the user has the permission for the use of a resource (e.g. starting and driving a car) or the access to a piece of infrastructure (e.g. enter a vehicle or a building or access a computer system).

As a solution for keyless building access, key cards with so-called near field communication (NFC), which is a passive RFID technology, are used. A battery less key card may approach the RFID reading device that, after detecting an authorized card (of the holder), may give order to unlock the door. Due to the passive nature and the employed radio frequencies, the reach of these technologies may be limited to several centimeters (<10 cm).

For vehicles, so-called keyfobs that actively communicate with the vehicle are in use that may usually communicate in two frequency ranges of the radio spectrum, low-frequency (LF) and ultrahigh frequency (UHF). However, it may be known that by applying a relay for one or both frequency ranges, the reach of the system can be extended. The signals coming from both sides may be the received by the relay, amplified and forwarded to the respective other device so that the actual keyholder may be several meters (up to 100 m or more) away from the vehicle. In this way, the system may be compromised and the car may unlock on the approach of the relaying device although the keyfob itself is not close enough.

The attack may be avoided by applying a round-trip time (RTT) measurement that may bind the distance to an upper limit (for example 10 m) by measuring the propagation time from the vehicle to the keyfob and back to the vehicle. Possible technologies for determining the propagation time may be ultra-wideband (UWB) transmissions but also frequency-hopping systems (similar to Bluetooth) based on carrier phase measurements (and potentially other extended methods). The latter may have the advantage that they may potentially be a low power technology. Most of these technologies aim at being integrated into new consumer devices like smartphones or wearables.

For the frequency hopping devices that are discussed here, the measured phase of the subcarriers is then $$\phi_k = \mathrm{mod}(2\pi f_k \tau_0 + \phi_0, 2\pi)$$

where $f_k$ is the subcarrier frequency at hand and $\tau_0$ is the single-link propagation delay to be estimated and $\phi_0$ is an arbitrary transmit phase of the initiator. The minimum subcarrier distance e.g. $f_k - f_{k+1}$ determines the ambiguity $$\phi_k - \phi_m = 2\pi \min(f_k - f_m)\tau_0 - l2\pi \text{ with } l=0,1,2,\ldots$$

so that the maximum delay $\tau_{0,max}$ for delay estimates without ambiguity is $$\tau_{0,max} = \frac{1}{\min(f_n - f_m)}.$$

Here, in case of a communication between a keyfob and a vehicle, frequency hopping based carrier phase measurements from messages exchanged between the initiator and the responder are considered. However, it is directly transferable to other keyless authorization use cases.

The transmitted messages are separated into portions in narrowband subcarriers that span a large part of the bandwidth in order to achieve maximum frequency diversity and estimation accuracy, and that, at the same time, sample the spectrum sufficiently dense in order to avoid strong ambiguities due to cycle slips (only part of the subcarriers need to be densely packed while others can be positioned further away without restrictions).

The subcarrier may be (pseudo-) randomly chosen, while abiding to the above requirements on the minimum frequency spacing and the maximum frequency span.

The commonly employed method for ranging with subcarrier phase based measurements (sometimes inherently) measures a linear phase ramp (a phase gradient) over the frequency range. In non-multipath scenarios, the gradient of the ramp is directly proportional to the desired delay. However, carrier phase based methods have the disadvantage that they are susceptible to malicious manipulations of the transmitted signals due to their narrow bandwidth and, hence, their slow modulation.

A possible attack method may directly alter the phase of the transmission in each channel. This may be battled by using random frequency hopping.

Another possible attack method may use the phase ambiguities in $2r$. If the propagation delay $t_{prop}$ is larger than the reciprocal of the minimum spacing of the frequency hopping carriers $$t_{prop} > \frac{1}{\min(f_n - f_m)} \forall m, n$$

then a wrap around of the phase may occur within the minimum spacing of the frequency hopping carriers. This wrap around may not be directly detected so that, in principle, all distance measurements using this method may be ambiguous: the set of measurements $\{\phi_1 \ldots \phi_K\}$ corresponds to fi equally as to any $$\hat{\tau}_l = \hat{\tau}_1 + l \cdot \frac{1}{\min(f_n - f_m)}$$

with l being an integer number.

It is to be noted that $t_{prop}$ corresponds to round trip time measurements so that for relay attacks on both partial links from the initiator (vehicle) to the responder (the mobile device: keyfob or smartphone) and from the responder (keyfob) to the initiator (vehicle), the delay on the partial links required to achieve a wrap around is only $\Delta\tau_{wrap} = [2 \cdot \min(f_n - f_m)]^{-1}$. In the absence of relays the higher values can often be rejected due to a limited range of the link. In the presence of the amplifying relay this must be achieved by other means.

With regard to the above, carrier phase based methods have the disadvantage that they are susceptible to malicious manipulations of the transmitted signals.

Since frequency hopping is based on carrier phase methods, there may be a need for avoiding manipulations of the transmitted signals for detecting relay attacks in order to prevent the same. Embodiments are related to detecting a novel attack on such frequency hopping systems.

SUMMARY

An example relates to a method to determine a jitter attack on authorization system granting permission using a resource, comprising receiving at least three subcarrier signals from an authentication device, determining a relative phase deviation from an expected relative phase behavior of at least three subcarrier signals, and concluding on a jitter attack if the phase deviation fulfills a predetermined criterion.

The novel jitter attack may already be detected by simply checking whether the relative phase deviation fulfills the predetermined criterion or in other words exceeds a predetermined threshold. In case the relative phase deviation between at least three subcarrier signals is too high, a jitter attack may be detected.

Another example further comprises receiving the signal from the authentication device of an automotive access system.

The described method may be applied to a vehicle having an authorization system to mitigate the risk of unauthorized use of the vehicle.

An additional example comprises determining the expected relative phase behavior.

By use of an expected relative phase behavior, the relative phase deviation may directly be determined.

In an optional example, determining the expected relative phase behavior comprises fitting a predetermined fit function to phase conditions measured for the at least three subcarrier signals.

The calculation of the expected relative phase behavior may provide an essential basis for the method to determine the extent of the relative phase deviation in order to check whether there is a jitter attack or not.

In a further example, determining the relative phase deviation comprises measuring multiple phase conditions for the same subcarrier.

A jitter attack may be detected from multiple measurements from the same subcarriers in one measurement run or in at least two consecutive measurement runs.

In another additional example, determining, whether the predetermined criterion is fulfilled, comprises averaging of relative phase deviations of the at least three signals, and computing a combined error metric.

Averaging the relative phase deviations of the at least three signals and computing a combined error metric helps to analyze the phase spread of the measurement.

In another optional example, the predetermined criterion is fulfilled when the deviation of the relative phase values of the at least three signals exceeds a predetermined threshold.

With a given, predetermined threshold it is possible to conclude on a jitter attack, in case the relative phase deviation exceeds the threshold.

In an additional example, the multiple measurements of phases within the same subcarriers are performed in one single measurement run or in at least two consecutive measurement runs.

In another additional example, the predetermined criterion is fulfilled when the deviation of the relative phase values of the at least three signals exceeds a predetermined threshold.

An embodiment relates to a vehicle comprising an authorization system, granting permission on using a resource, comprising a jitter attack detecting device for determining a jitter attack, comprising a receiver configured to receive at least three subcarrier signals from an authentication device, a detector configured to determine a relative phase deviation from an expected relative phase behavior for the at least two subcarrier signals, and a processor configured to conclude on a jitter attack if the relative phase deviation fulfills a predetermined criterion.

An additional embodiment further comprises a calculator configured to average relative phase deviations of the at least three signals, and to compute a combined error metric.

In an optional embodiment, the calculator is further configured to determine the expected relative phase behavior by fitting a predetermined fit function to phase conditions measured for the at least three subcarrier signals.

Another embodiment relates to a computer program having a program code for, when executed on a processor, causes the execution of the method for determining a jitter attack.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality.

Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 3:
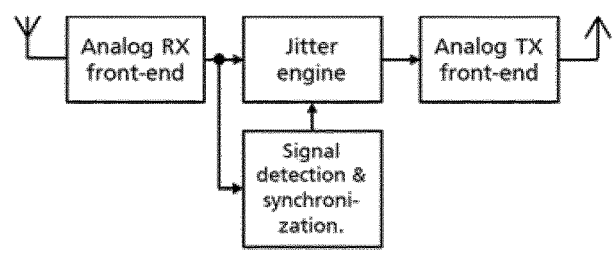
FIG. 3 illustrates an attacking relay adding frequency independent jitter.

In order to describe the novel underlying attack more detailed, FIG. 3 schematically describes the novel jitter attack, as it may be detected. For the underlying attack on the distance bounding system, the phase of the forwarded subcarrier signal is altered with a pseudo-random jitter $\phi_{jitter}(nT)$. Even a limited phase jitter $|\phi_{jitter}| \leq \phi_{max} < \pi$ may not only reduce the estimation quality, while still allowing for a regular signal detection. In simulations, it has been even observed that, given a number of measurements $N_M > 5$ subcarriers, it is possible to lower the distance estimate statistically, but with very high probability. Naturally, technical jitter is usually orders of magnitude below an affecting value (usually as a design criterion), so that only artificial jitter creation can realistically achieve an attack with sufficient probability of success.

The jitter creation and insertion is triggered by detecting a new signal burst (in a new subcarrier frequency). A new random phase value independently uniformly distributed in the range $-\phi_{max} \leq \phi_{jitter} \leq \phi_{max}$ is assumed. Then, the randomized phase jitter remains constant over each hopping interval. This would account for a relay synchronizing with the hopping interval irrespective of the subcarrier the system hops into.

In a version of an attack, in additional logic recognizes only the outermost frequency-hopping subcarriers and distorts these subcarriers, selectively. However, the strongest threat seems to arise from the case, where random jitter affects all subcarriers, independently.

It can be demonstrated that given strong jitter the distance estimate is reduced significantly with a moderate spread of the estimates in terms of the standard deviation/the variance.

Figure 4:
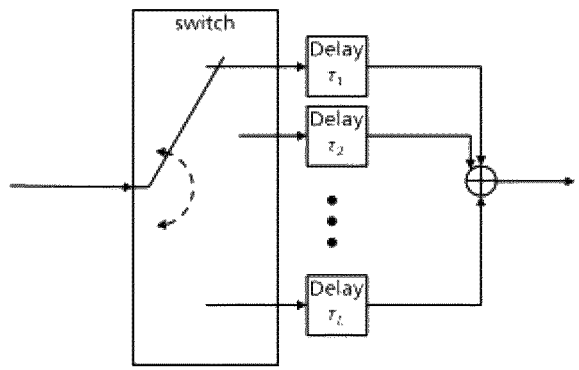
FIG. 4 illustrates artificial generation based on switched delay bank.

The effect of the attack is visualized in FIG. 4. This also indicates a powerful attack with low numbers of unsuccessful attacks.

A potential realization of the phase jitter may be performed based on a switched delay bank like in FIG. 3, where the delays xi arouse a phase shift of $\phi_{jitter,k,l}$=mod ($2\pi f_k \tau_l$, $2\pi$), where uniformly distributed quasi-random distributed $\phi_{jitter,k,l}$ result even for low delays in the order of magnitude of $\tau_l < 2/f_n$. For the example of $f_k$=2.44 GHz, the delays may be in the order of $$\frac{2}{f_k} \approx 0.82 \text{ ns.}$$

The (switched) delays may well be distributed between 0 ns$\leq \tau_l \leq 2/f_k$ with a minimum of approximately L=5 delays.

Figure 5:
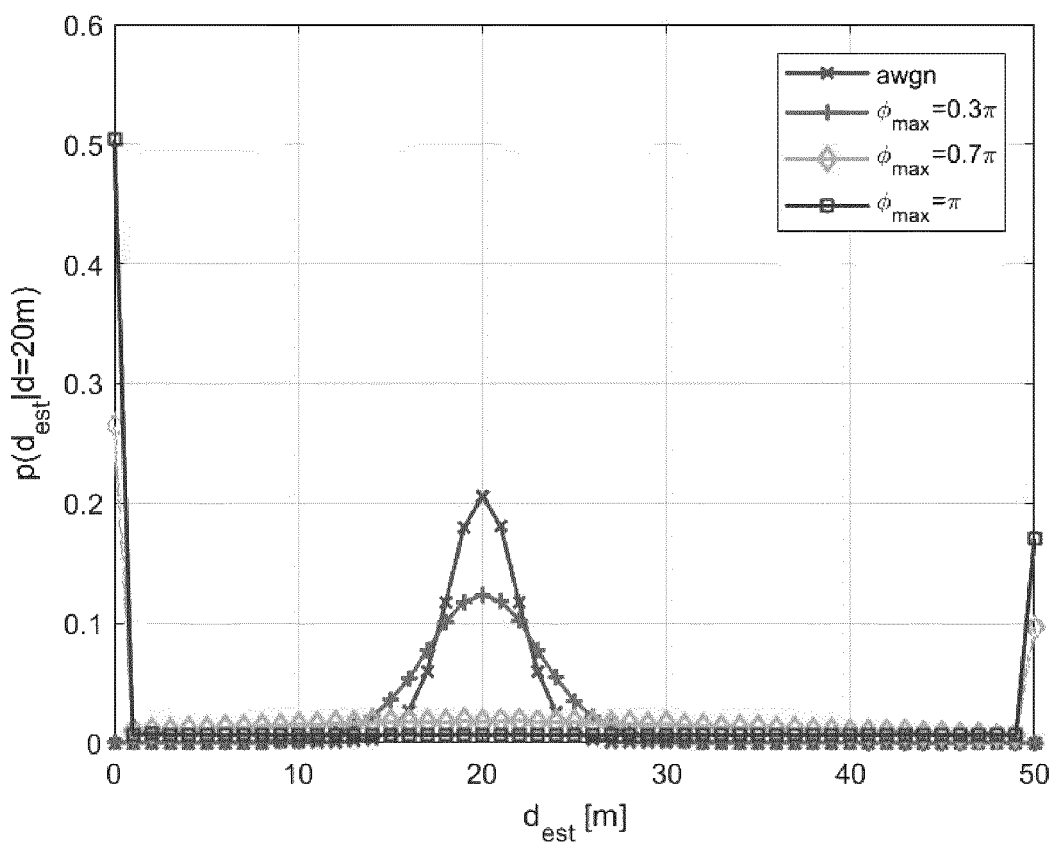
FIG. 5 shows experimental probability density function (PDF) with artificial jitter (true distance=20 m) and phasor based averaging.
Figure 6:
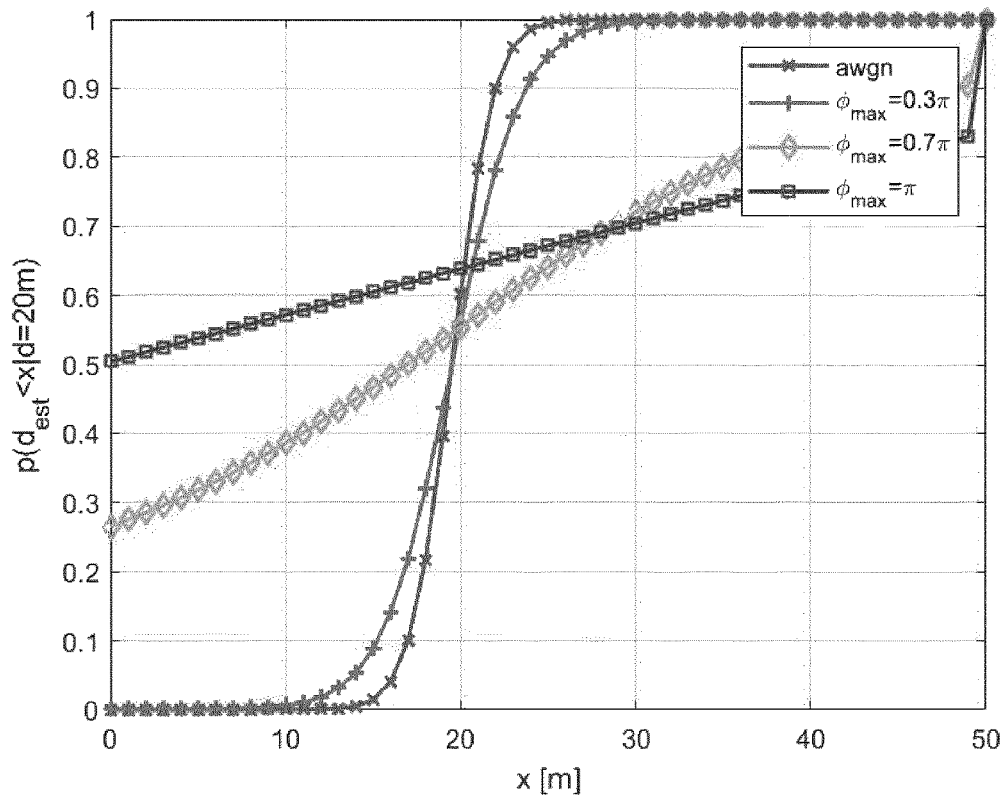
FIG. 6 shows experimental cumulative density function (CDF) with artificial jitter (true distance=20 m) and phasor based averaging.

In FIG. 5 and FIG. 6 the experimental probability density function (PDF) and the cumulative density function (CDF) of phase gradient based distance estimates are displayed. To do so 100 Thousand estimates have been performed at a subcarrier SNR of 3 dB each for no jitter (AWGN) as well as for three max jitter values $\phi_{max} \in \{0.3\pi, 0.7\pi, \pi\}$. Low jitter increase the error variance, but when the jitter gets strong, it provides a high probability of low distance estimates. For the figures, the phase gradient has been computed by averaging the phasors:

$$\overline{\Delta \phi} = \arg\left\{\sum_{k=2}^{K} y_k y_{k-1}^*\right\}.$$

Figure 7:
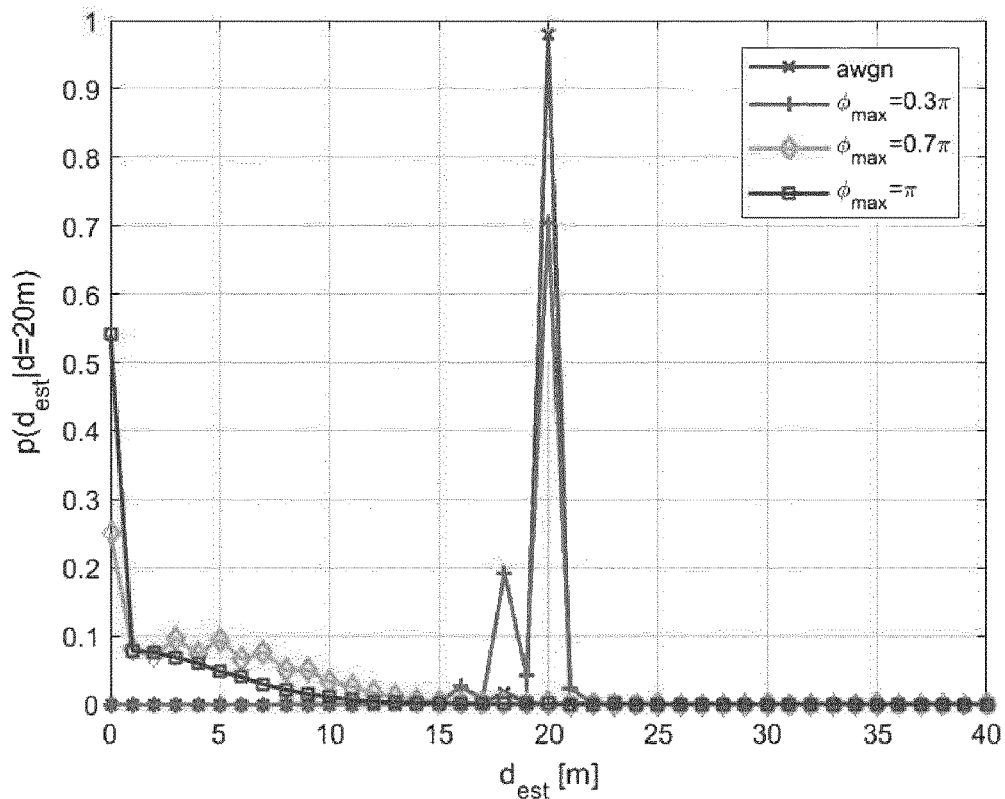
FIG. 7 shows experimental PDF with artificial jitter (true distance=20 m) and phase based averaging.
Figure 8:
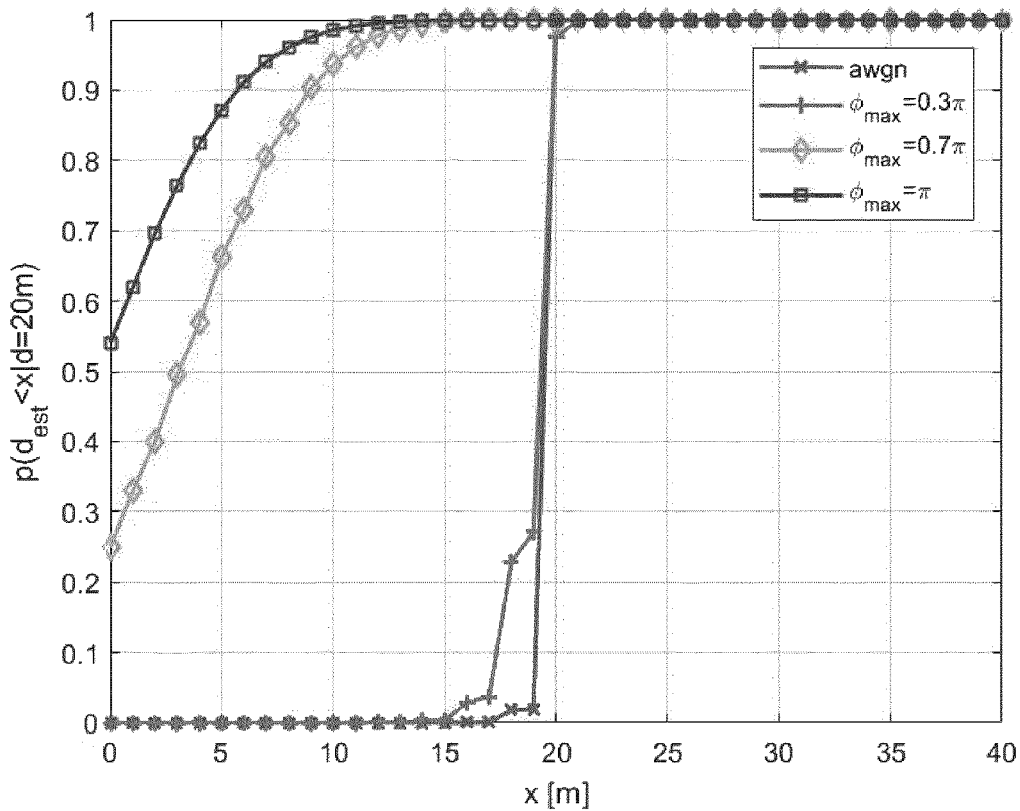
FIG. 8 shows experimental CDF with artificial jitter (true distance=20 m) and phase based averaging.

For phase based averaging the effect of the jitter attack is even more prominent as displayed in FIG. 7 and FIG. 8 for a subcarrier SNR of 10 dB. Phase averaging suffers from stronger nonlinear distortion due to averaging after the phase computation (instead of averaging and then applying the non-linearity) and errors in the necessary phase unwrapping, when underlying phase ramp approaches and exceeds the ambiguity at $\pm\pi$.

Figure 1:
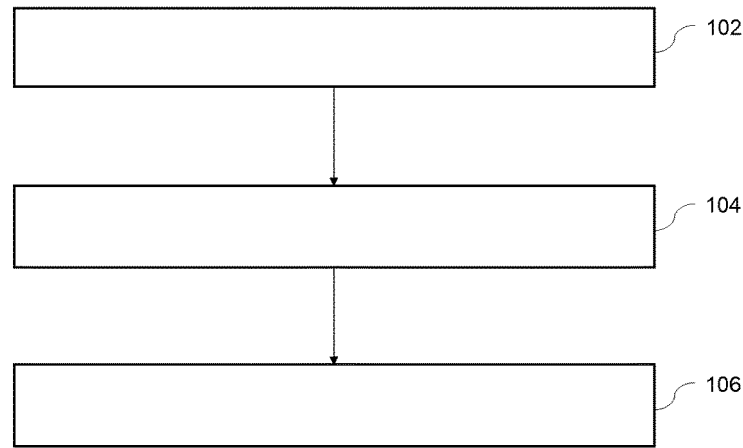
FIG. 1 shows a flow chart illustrating the method for detecting a jitter attack.

FIG. 1 describes a method to determine a jitter attack on authorization system granting permission using a resource, comprising receiving at least three subcarrier signals from an authentication device (step 102), determining a relative phase deviation from an expected relative phase behavior of at least two subcarrier signals (step 104), and concluding on a jitter attack if the relative phase deviation fulfills a predetermined criterion (step 106).

The novel jitter attack may already be detected by simply checking whether the phase deviation fulfills the predetermined criterion or in other words exceeds a predetermined threshold. In case the relative phase deviation between at least three subcarrier signals is too high, a jitter attack may be detected.

Another example further comprises receiving the signal from the authentication device of an automotive access system.

The described method may be applied to a vehicle having an authorization system to mitigate the risk of unauthorized use of the vehicle.

An additional example comprises determining the expected relative phase behavior.

By use of an expected relative phase behavior, the relative phase deviation may directly be determined.

In an optional example, determining the expected relative phase behavior comprises fitting a predetermined fit function to phase conditions measured for the at least three subcarrier signals.

The calculation of the expected relative phase behavior may provide an essential basis for the method to determine the extent of the relative phase deviation in order to check whether there may be a jitter attack or not.

In a further example, determining the relative phase deviation comprises measuring multiple phase conditions for the same subcarrier.

A jitter attack may be detected from multiple measurements from the same subcarriers in one measurement run or in at least two consecutive measurement runs.

In another additional example, determining, whether the predetermined criterion is fulfilled, comprises averaging of relative phase deviations of the at least three signals, and computing a combined error metric.

Averaging the relative phase deviations of the at least three signals and computing a combined error metric may help to analyze the phase spread of the measurement.

In another optional example, the predetermined criterion is fulfilled when the deviation of the relative phase values of the at least three signals exceeds a predetermined threshold.

With a given, predetermined threshold it may be possible to conclude on a jitter attack, in case the relative phase deviation exceeds the threshold.

In an additional example, the multiple measurements of phases within the same subcarriers are performed in one single measurement run or in at least two consecutive measurement runs.

In another additional example, the predetermined criterion is fulfilled when the deviation of the relative phase values of the at least three signals exceeds a predetermined threshold.

Specifically, an approach for a first novel method for detecting the above described jitter attack is to analyze the phase spread of the phase measurement in relation to the phase ramp as expected from the distance estimate, for example the estimates of the propagation delay or the related phase gradient. Reformulated, this may yield as for the average (or otherwise extracted) phase increment estimate $$\overline{\Delta\phi} = f(\phi_1 \ldots \phi_K)$$

with some estimating function $f(\ldots)$. Usually, the estimator may implement a kind of averaging of the differences, for example $$\overline{\Delta\phi} = f(\phi_1 \cdots \phi_K) = K(f_1 \cdots f_K) \cdot \sum_{k=1}^{K} \sum_{m=k+1}^{K} \frac{1}{f_k - f_m} \cdot \text{unwrap}(\phi_k - \phi_m).$$

Phase unwrapping, therein, may eliminate the effect of the phase ambiguity in $\pm\pi$. Thus preferably, measured (demodulated or unmodulated) carrier phasors $p_k = A_k \exp(j\phi_k) + w_k$ may be used instead of phases eliminating the phase unwrapping. Therein, $A_k$ and $w_k$ are the magnitude and the measurement noise, respectively. The a potential implementation of the estimator may be $$\overline{\Delta\phi} = f'(p_1 \ldots p_K) = K(f_1 \cdots f_K) \cdot \sum_{k=1}^{K} \sum_{m=k+1}^{K} \frac{1}{f_k - f_m} \cdot \arg\{p_k \cdot p_m^*\}.$$

The phase differences $\overline{\Delta\phi}$ directly relates to the distance $$d = \frac{c_0}{2\pi\Delta f} \cdot \Delta\phi \text{ and } \overline{d} = \frac{c_0}{2\pi\Delta f} \cdot \overline{\Delta\phi}$$

via the propagation delay $$\tau_0 = \frac{\Delta\phi}{2\pi\Delta f} \text{ and } \overline{\tau_0} = \frac{\overline{\Delta\phi}}{2\pi\Delta f}.$$

The relation $f(\phi_1 \ldots \phi_K)$ may well fulfill the least squares (LS) criterion (but it does not necessarily need to). Hence, also the least squares metric may be used for evaluating the model match of the linear gradient approximation.

It is important to note that the first novel method does not preclude the linear gradient model, e.g. estimator for strong multipath scenarios. Also, non-linear models may fit the scheme, however the expected phase in each subcarrier must be computed according to this non-linear model and its estimated parameterization.

Figure 9:
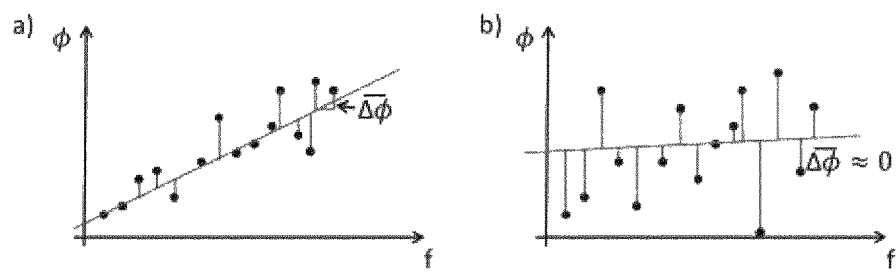
FIG. 9 illustrates phase measurements with derived phase ramp (blue line) and error for (a) noisy phase measurements and (b) uniformly distributed phases.

The inventive method uses a back propagation. $\overline{\Delta\phi}$ is then compared to the phase measurements computing the combined error metric, e.g. according to $$M_{err}^{(\nu)} = \frac{1}{K-1} \cdot \sum_{k=1}^{K-1} |\mu_k \cdot \overline{\Delta\phi} - (\phi_k - \phi_{k+1})|^\nu > M_\nu^{threshold}. \quad (1.A)$$

with $$\mu_k = \left(\frac{f_k - f_{k+1}}{\Delta f_{min}}\right)$$

and for small $\overline{\Delta\phi}$ otherwise cycle slip handling must be taken care of). It may be evaluated linearly from the absolute value ($\nu$=1) or in a squared manner ($\nu$=2)—other exponents may be used, but will probably have no real relevance for implementation. FIG. 9 shows such a measurements for a signal with distinct phase ramp over the frequency (FIG. 9a) and for random uniformly distributed phases (FIG. 9b), e.g. measurement entirely corrupted by induced strong phase jitter.

It is evident that in the second case the above metric $M_{err}^{(\nu)}$ is significantly higher irrespective if $\nu$=1 or $\nu$=2. The choice of the exponent $\nu$=2 weights large, individual absolute errors $|\mu_k \cdot \overline{\Delta\phi} - (\phi_k - \phi_{k+1})|$ higher than for $\nu$=1. A suitable choice of the threshold $M_\nu^{threshold}$ depends on the exponent $\nu$. It may be determined statistically from evaluating simulations or field tests or potentially, analytically, from directly analyzing equation (1.A) for presumed channel settings (for example worst case channel settings). This threshold can be based on a prior estimate of the SNR and of the multipath situation. At low SNR and with dense multipath inaccurate measurements of the estimator may result.

In principle, more complicated non-linear models can be used (see above), e.g. models considering more than one propagation path. Then, the error metric should also apply this extended channel model. However, the more degree of freedom are available the closer we may approach any distribution of phases, for example the model order must be strictly limited at some (now undetermined) level.

Figure 10:
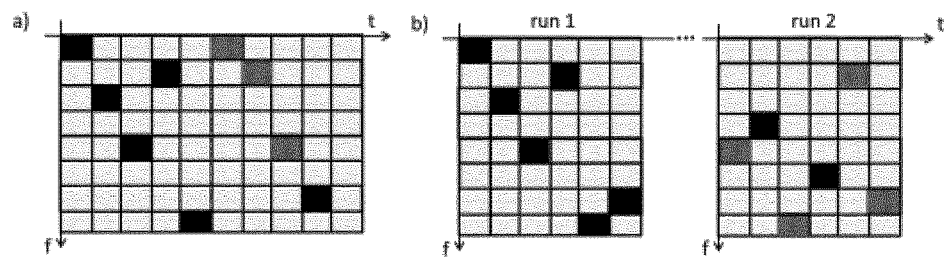
FIG. 10 illustrates double measurements of the phase within the same subcarriers with the repetition marked in red in (a) one single measurement run and b) in multiple (two) measurement runs.

An approach for a second novel approach detects the attack from multiple measurements within the same subcarriers in one measurement run (FIG. 10a) or in at least two consecutive measurement runs (FIG. 10b). It may have the advantage that it does not make any assumptions on the channel (transfer function) other than that it remains approximately constant and that the signal to noise ratio (SNR) is in an allowable range. This may come at the cost of redundant phase information in the non-distorted case based on redundant transmissions (in terms of the employed subcarrier), i.e. at the cost of higher resource usage.

Given an acceptable SNR, the frequency hopping system may conclude that a jitter attack as described in here has been active if the phase values of repeated measurements in one or multiple subcarriers differ too much. Equivalently, the comparison may go for phase differences between two subcarriers in one (FIG. 10a) or multiple (FIG. 10b) measurement runs.

The initiator compares the phases after the complete reception of all carrier signals for the phase measurements from the reflector and the complete transmission of the respective phase measurements from the reflector side.

The derivation presumes that the system provides N measurements in the subcarriers $k_n$ with n=1 ... N at least twice. Thus, the system provides frequency diversity in signaling and measurements. Here, the multiple measurements are denoted by $\phi_{k_n,1}^{reflector/initiator}$ and $\phi_{k_n,2}^{reflector/initiator}$. This means, the final phase measurement can be computed to $$\phi_{k_n,1} = \text{unwrap}(\phi_{k_n,1}^{reflector} - \phi_{k_n,2}^{initiator}), \text{ and}$$

$$\phi_{k_n,2} = \text{unwrap}(\phi_{k_n,2}^{reflector} - \phi_{k_n,2}^{initiator})$$

The unwrap operation aligns the measurements according to their neighbors and is necessitated due to the phase ambiguity (or the phase wrap) at $\pm\pi$. Thus, the local phase error in the $k_n$-th subcarrier in the measurement runs 1 and 2 is determined by $$\Delta\phi_{k_n} = \phi_{k_n,1} - \phi_{k_n,2}.$$

Then, a detection event for observing a single subcarrier follows from the first threshold comparison $$|\Delta\phi_{k_n}|^v > \phi_{single,v}^{threshold} \quad (2.A)$$

with the choice of a suitable v={1,2} and/or from the combined threshold $$\sum_{n=1}^{N} |\Delta\phi_{k_n}|^v > \phi_{sum,v}^{threshold} \quad (2.B)$$

that is evaluated for multiple subcarriers and v={1,2}. Another alternative metric considers the differences of the repeated subcarrier phases $$\sum_{n=1}^{N}\sum_{m=n}^{N} |(\phi_{k_n,1} - \phi_{k_m,1}) - (\phi_{k_n,2} - \phi_{k_m,2})|^v > \phi_{diffsum,v}^{threshold} \quad (2.C)$$

based on a suitable exponent v={1,2}. It is feasible to combine the threshold test given in equations (2. A) and (2. B) as well as (2. A) and (2. C). A combination of equations (2. B) and (2. C) seems less reasonable as most information is contained in both metrics.

If only parts of the subcarriers suffer from the jitter, a good distribution of subcarriers in both measurement runs is necessary in terms of coverage (covering most parts of the employed spectrum) and resolution. The latter requires also analyzing also close subcarriers. Otherwise, e.g. only every other subcarrier may be distorted by jitter. This may already have strong impact (as simulations have shown).

Figure 2:
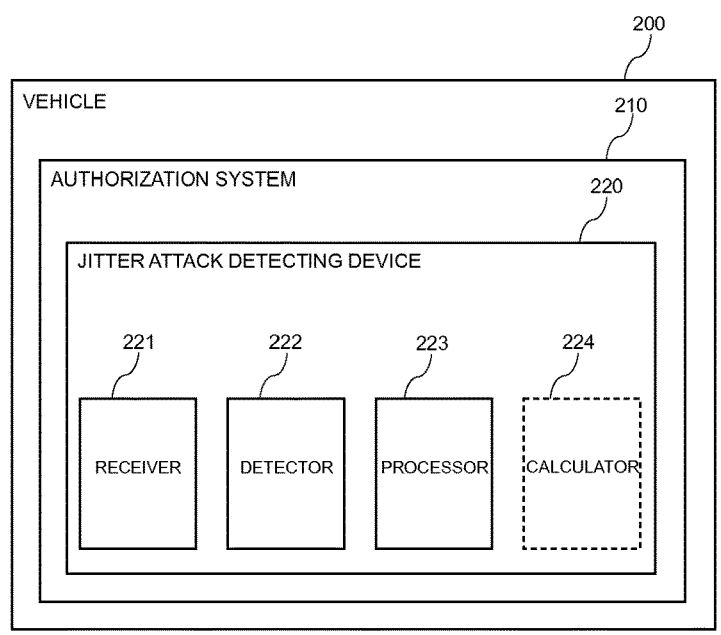
FIG. 2 shows a block diagram illustrating a jitter detecting device.

FIG. 2 describes a vehicle 200 comprising an authorization system 210, granting permission on using a resource, comprising a jitter attack detecting device 220 for determining a jitter attack, comprising a receiver 221 configured to receive at least three subcarrier signals from an authentication device, a detector 222 configured to determine a relative phase deviation from an expected relative phase behavior for the at least three subcarrier signals, and a processor 223 configured to conclude on a jitter attack if the relative phase deviation fulfills a predetermined criterion.

An additional embodiment further comprises a calculator 224 configured to average relative phase deviations of the at least three signals, and to compute a combined error metric.

In an optional embodiment, the calculator 224 is further configured to determine the expected relative phase behavior by fitting a predetermined fit function to phase conditions measured for the at least three subcarrier signals.

Another embodiments relates to a computer program having a program code for, when executed on a processor, causes the execution of the method for determining a jitter attack.

A smart relay may be theoretically designed that detects the subcarrier and reuses the same phase always for the same subcarriers. Then the second detection approach may not work properly. However, such an adaptive relay would require a significant piece of engineering and more potent hardware. Additionally, the error threshold from the first inventive method is still working.

Consequently in order to improve the detection rate, it may be an alternative way to combine the above approaches for detecting a jitter attack with a suitable choice of their variants and of their thresholds.

The aspects and features mentioned and described together with one or more of the previously detailed examples and figures, may as well be combined with one or more of the other examples in order to replace a feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method to determine a jitter attack on an authorization system granting permission for using a resource, comprising:
   receiving at least three subcarrier signals from an authentication device;
   determining a relative phase deviation from an expected relative phase behavior for the at least three subcarrier signals, wherein determining the relative phase deviation comprises measuring multiple phase conditions for each subcarrier signal of the at least three subcarrier signals; and
   concluding on a jitter attack when the relative phase deviation fulfills a predetermined criterion.

2. The method of claim 1, further comprising receiving the at least three subcarrier signals from the authentication device of an automotive access system.

3. The method of claim 1, further comprising:
   determining the expected relative phase behavior.

4. The method of claim 3, wherein determining the expected relative phase behavior comprises fitting a predetermined fit function to phase conditions measured for the at least three subcarrier signals.

5. The method of claim 4, wherein determining whether the predetermined criterion is fulfilled comprises:
   averaging of relative phase deviations of the at least three subcarrier signals, and
   computing a combined error metric.

6. The method of claim 5, wherein the predetermined criterion is fulfilled when the relative phase deviations between multiple subcarrier signals deviation of the relative phase values of the at least three subcarrier signals exceeds a predetermined threshold.

7. The method of claim 1, wherein determining whether the predetermined criterion is fulfilled comprises:
   averaging of relative phase deviations of the at least three subcarrier signals, and
   computing a combined error metric.

8. The method of claim 7, wherein the predetermined criterion is fulfilled when the relative phase deviations between multiple subcarrier signals of the at least three subcarrier signals exceeds a predetermined threshold.

9. The method of claim 1, wherein the predetermined criterion is fulfilled when the relative phase deviation of one subcarrier signal exceeds a predetermined threshold.

10. The method of claim 1, wherein measuring multiple phase conditions for each subcarrier of the at least three subcarriers is performed in at least one of
    one single measurement run, and
    at least two consecutive measurement runs.

11. The method of claim 10, wherein the predetermined criterion is fulfilled when the relative phase deviations between multiple subcarrier signals of the at least three subcarrier signals exceeds a predetermined threshold.

12. The method of claim 1, wherein the predetermined criterion is fulfilled when the relative phase deviations between multiple subcarrier signals of the at least three subcarrier signals exceeds a predetermined threshold.

13. A vehicle comprising an authorization system, granting permission on using a resource, comprising a jitter attack detecting device for determining a jitter attack, comprising:
    a receiver configured to receive at least three subcarrier signals from an authentication device;
    a detector configured to determine a relative phase deviation from an expected relative phase behavior for the at least three subcarrier signals, wherein determining the relative phase deviation comprises measuring multiple phase conditions for a subcarrier of the at least three subcarrier signals; and a processor configured to conclude on a jitter attack when the relative phase deviation fulfills a predetermined criterion.

14. The vehicle according to claim 13, wherein the jitter attack detecting device further comprises a calculator configured to average relative phase deviations of the at least three subcarrier signals, and to compute a combined error metric.

15. The vehicle according to claim 14, wherein the calculator is further configured to determine the expected relative phase behavior by fitting a predetermined fit function to phase conditions measured for the at least three subcarrier signals.

16. A non-transitory, computer readable medium comprising a computer program having a program code for, when executed on a processor, causing the execution of a method comprising:

receiving at least three subcarrier signals from an authentication device;

determining a relative phase deviation from an expected relative phase behavior for the at least three subcarrier signals, wherein determining the relative phase deviation comprises measuring multiple phase conditions for each subcarrier of the at least three subcarrier signals; and concluding on a jitter attack when the relative phase deviation fulfills a predetermined criterion.

* * * * *